(12) United States Patent
Yoshikawa et al.

(10) Patent No.: US 7,883,218 B2
(45) Date of Patent: Feb. 8, 2011

(54) PROJECTOR HAVING A LIGHT TUNNEL CLIP FOR SUPPRESSING POSITIONAL DEVIATION OF A LIGHT TUNNEL

(75) Inventors: Tsutomu Yoshikawa, Daito (JP); Yusuke Ohta, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 999 days.

(21) Appl. No.: 11/684,021

(22) Filed: Mar. 9, 2007

(65) Prior Publication Data

US 2007/0216871 A1 Sep. 20, 2007

(30) Foreign Application Priority Data

Mar. 20, 2006 (JP) .............................. 2006-077027

(51) Int. Cl.
  G03B 21/14 (2006.01)
  G03B 21/16 (2006.01)
  G03B 21/28 (2006.01)
  G02B 6/00 (2006.01)
  F21V 7/04 (2006.01)

(52) U.S. Cl. .................... 353/97; 353/122; 353/60; 353/61; 353/98; 362/551; 385/133

(58) Field of Classification Search ................. 353/122, 353/97, 60–61, 98–99; 362/551; 385/133
See application file for complete search history.

(56) References Cited

U.S. PATENT DOCUMENTS 6,976,778 B2 * 12/2005 Kamijima .................... 362/583
7,004,586 B2   2/2006 Morinaga
7,566,135 B2 * 7/2009 Oh et al. ..................... 353/99
2002/0051122 A1 5/2002 Kakuta et al.
2003/0053787 A1 3/2003 Lee
2003/0098956 A1 * 5/2003 Chang et al. ................. 353/52
2004/0090598 A1 5/2004 Morinaga (Continued)

FOREIGN PATENT DOCUMENTS

JP   3092510 U   12/2002

(Continued)

OTHER PUBLICATIONS

European Search Report dated Jun. 8, 2007 (Eight (8) pages).

*Primary Examiner*—Georgia Y Epps
*Assistant Examiner*—Magda Cruz
(74) *Attorney, Agent, or Firm*—Crowell & Moring LLP

(57) ABSTRACT

A projector capable of preventing a light tunnel from positional deviation is obtained. This projector comprises a rectangular light tunnel having a hollow light guide path capable of passing light therethrough for shaping the light with the light guide path, an optical component holding member provided with a holding portion holding the light tunnel and a light tunnel clip including a first pressing portion and a second pressing portion pressing first and second surfaces, adjacent to each other, of the light tunnel toward the holding portion of the optical component holding member for holding the light tunnel in a pressed state, while the first pressing portion and the second pressing portion press positions of the first and second surfaces of the light tunnel located substantially on the same line perpendicular to the traveling direction of the light respectively.

17 Claims, 13 Drawing Sheets

U.S. PATENT DOCUMENTS

| | | |
|---|---|---|
| 2004/0239883 A1 | 12/2004 | Yoshikawa |
| 2005/0024601 A1 | 2/2005 | Morinaga |
| 2005/0111818 A1* | 5/2005 | Wang et al. .................. 385/147 |
| 2006/0008228 A1* | 1/2006 | Kitamura et al. ............ 385/133 |

FOREIGN PATENT DOCUMENTS

| | | |
|---|---|---|
| JP | 3093005 U | 1/2003 |
| JP | 2004-354925 A | 12/2004 |
| JP | 2005-43603 A | 2/2005 |

* cited by examiner

PROJECTOR HAVING A LIGHT TUNNEL CLIP FOR SUPPRESSING POSITIONAL DEVIATION OF A LIGHT TUNNEL

BACKGROUND OF THE INVENTION

1. Field of the Invention

The present invention relates to a projector, and more particularly, it relates to a projector having a light tunnel.

2. Description of the Background Art

A projector having a light tunnel for forming light from a source lamp into a prescribed shape is known in general, as disclosed in Japanese Patent Laying-Open No. 2004-354925, Japanese Utility Model Registration No. 3093005, Japanese Utility Model Registration No. 3092510 or Japanese Patent Laying-Open No. 2005-43603. Each of Japanese Utility Model Registration No. 3092510 and Japanese Patent Laying-Open No. 2005-43603 proposes a light tunnel clip for holding the light tunnel on the projector. On the other hand, Japanese Patent Laying-Open No. 2004-354925 and Japanese Utility Model Registration No. 3093005 disclose no light tunnel clips.

FIG. 17 is a perspective view of a casting 100 mounted with a light tunnel 101 of the conventional projector disclosed in Japanese Utility Model Registration No. 3092510. FIG. 18 is a perspective view of a conventional light tunnel clip 102 disclosed in Japanese Utility Model Registration No. 3092510. FIG. 19 is a perspective view of the conventional light tunnel clip 102 disclosed in Japanese Utility Model Registration No. 3092510 mounted on the casting 100. The structure of a portion around the light tunnel 101 of the conventional projector disclosed in Japanese Utility Model Registration No. 3092510 is now described with reference to FIGS. 17 to 19.

As shown in FIG. 17, the casting 100 is provided with a groovelike holding portion 100a holding the light tunnel 101 (see FIG. 19). The casting 100 is also provided with a pair of threaded holes 100b receiving a pair of screws 103 (see FIG. 19) for mounting the light tunnel clip 102 (see FIG. 18) thereon. The casting 100 is further provided with a pair of bosses 100c for positioning the light tunnel clip 102.

As shown in FIG. 18, the light tunnel clip 102 is provided with pressing portions 102a, 102b, 102c and 102d pressing the outer surfaces of the light tunnel 101 against the holding portion 100a of the casting 100. As shown in FIG. 19, the pressing portions 102a and 102b are so formed as to press a first surface 110a of the light tunnel 101, while the pressing portions 102c and 102d are so formed as to press a second surface 101b of the light tunnel 101. The light tunnel clip 102 is provided with a pair of positioning holes 102e for fitting with the pair of positioning bosses 100c of the casting 100 respectively. The light tunnel clip 102 is also provided with a pair of screw receiving holes 102f receiving the pair of screws 103 for mounting the light tunnel clip 102 on the casting 100 respectively. The light tunnel clip 102 is further provided with a mask portion 102g for screening the outer periphery of an inlet of the light tunnel 101 from light.

When the light tunnel 101 is arranged on the holding portion 100a of the casting 100, the positioning bosses 100c of the casting 100 are fitted into the positioning holes 102e for positioning the light tunnel clip 102, and the two screws 103 are inserted into the screw receiving holes 102f. The light tunnel clip 102 mounted on the casting 100 presses the first surface 101a of the light tunnel 101 toward the holding portion 100a of the casting 100 with the pressing portions 102a and 102b, while pressing the second surface 101b of the light tunnel 101 also toward the holding portion 100a of the casting 100 with the pressing portions 102c and 102d.

Japanese Patent Laying-Open No. 2005-43603 discloses a projector having a light tunnel clip, similar to that disclosed in Japanese Utility Model Registration No. 3092510, provided with a stop member for easily registering relative positions of a lamp case storing a source lamp and a light tunnel.

In each of the projectors according to Japanese Patent Laying-Open No. 2005-43603 and Japanese Utility Model Registration No. 3092510, however, the pressing portions 102a, 102b, 102c and 102d of the light tunnel clip 102 press different positions $P_5$, $P_6$, $P_7$ and $P_8$ of the light tunnel 101 in the traveling direction of light L respectively, as shown in FIG. 19. Therefore, pressing force nonuniformly acts on the light tunnel 101 in the traveling direction of the light L. Thus, the position of the light tunnel 101 disadvantageously shifts due to vibration of a motor or the like provided on the projector.

SUMMARY OF THE INVENTION

The present invention has been proposed in order to solve the aforementioned problem, and an object of the present invention is to provide a projector capable of preventing a light tunnel from positional deviation.

In order to attain the aforementioned object, a projector according to a first aspect of the present invention comprises a rectangular light tunnel having a hollow light guide path capable of passing light therethrough for shaping the light with the light guide path, an optical component holding member provided with a holding portion holding the light tunnel and a light tunnel clip including a first pressing portion and a second pressing portion pressing first and second surfaces, adjacent to each other, of the light tunnel toward the holding portion of the optical component holding member for holding the light tunnel in a pressed state, while the first pressing portion and the second pressing portion press positions of the first and second surfaces of the light tunnel located substantially on the same line perpendicular to the traveling direction of the light respectively.

The projector according to the first aspect of the present invention, provided with the light tunnel clip including the first and second pressing portions pressing the positions of the first and second surfaces of the light tunnel located substantially on the same line perpendicular to the traveling direction of the light as hereinabove described, can press the positions of the first and second surfaces of the light tunnel located substantially on the same line perpendicular to the traveling direction of the light with the first and second pressing portions, thereby suppressing deviation of positions subjected to pressing force acting on the first and second surfaces of the light tunnel along the traveling direction of the light. Thus, the light tunnel, stably held on the holding portion of the optical component holding member, can be inhibited from positional deviation resulting from vibration of a motor or the like.

In the aforementioned projector according to the first aspect, the optical component holding member preferably includes a first engaging hole and a second engaging hole so arranged as to hold the light tunnel therebetween, and the light tunnel clip preferably includes a first engaging pawl and a second engaging pawl of a springy material engaging with the first engaging hole and the second engaging hole respectively. According to this structure, the light tunnel clip can be mounted on the optical component holding member by engaging the first and second engaging pawls of the light tunnel clip with the first and second engaging holes of the optical component holding member respectively. Thus, a step of mounting the light tunnel clip can be simplified as compared with a case of mounting the light tunnel clip on the optical component holding member through screws or the like, and the number of components can be reduced. Further, the first and second engaging pawls are composed of the springy material, whereby vibration of the light tunnel can be absorbed dissimilarly to a case of fixing the light tunnel clip to the optical component holding member with screws.

In this case, the second engaging pawl of the light tunnel clip is preferably so formed as to nip an edge of the second engaging hole of the optical component holding member. According to this structure, the light tunnel clip can be inhibited from jolting with respect to the optical component holding member, whereby the light tunnel can be further inhibited from positional deviation.

In the aforementioned projector according to the first aspect, the light tunnel clip preferably further includes a mask portion for screening the outer periphery of an inlet of the light tunnel from the light, and the optical component holding member preferably integrally includes a positioning protrusion for positioning the light tunnel clip by coming into contact with the mask portion of the light tunnel clip. Thus, the integrally provided positioning protrusion can be brought into contact with the mask portion of the light tunnel clip for positioning the light tunnel clip, whereby the light tunnel clip can be positioned without any additional component.

In this case, the optical component holding member preferably further includes an opening for partially receiving the mask portion of the light tunnel clip. According to this structure, the mask portion of the light tunnel clip can be partially fitted into the opening of the optical component holding member, to be prevented from positional deviation resulting from dispersion in working accuracy for folding the mask portion. Thus, the mask portion can be prevented from interfering with a color wheel or the like, whereby the mask portion and the color wheel or the like can be prevented from breakage.

In the aforementioned projector according to the first aspect, the holding portion of the optical component holding member preferably includes projecting first and second support portions for supporting prescribed portions of third and fourth surfaces of the light tunnel respectively and an air inlet for cooling the light tunnel. According to this structure, the prescribed portions of the third and fourth surfaces of the light tunnel can be arranged on the projecting first and second support portions of the holding portion respectively, thereby forming spaces between the holding portion and the third and fourth surfaces of the light tunnel respectively. In this case, the optical component holding member is provided with the air inlet for cooling the light tunnel so that air introduced from the air inlet of the holding portion can flow through the spaces formed between the holding portion and the third and fourth surfaces of the light tunnel by the aforementioned first and second support portions respectively, whereby cooling efficiency for the light tunnel can be improved.

In the aforementioned projector according to the first aspect, the light tunnel clip is preferably provided with two first pressing portions, and the two first pressing portions are preferably so formed as to press first and second sides of the first surface of the light tunnel along the extensional direction of the light tunnel toward the holding portion of the optical component holding member respectively. Thus, the light tunnel can be stably held on the holding portion of the optical component holding member due to the two first pressing portions pressing the first and second sides of the first surface of the light tunnel along the extensional direction of the light tunnel toward the holding portion of the optical component holding member respectively.

In this case, the light tunnel clip is preferably provided with two second pressing portions, the two second pressing portions are preferably so formed as to press first and second sides of the second surface of the light tunnel along the extensional direction of the light tunnel toward the holding portion of the optical component holding member respectively, the first pressing portion and the second pressing portion pressing the first sides along the extensional direction of the light tunnel respectively preferably press positions located on a first line perpendicular to the traveling direction of the light, and the first pressing portion and the second pressing portion pressing the second sides along the extensional direction of the light tunnel respectively preferably press positions located on a second line perpendicular to the traveling direction of the light. According to this structure, the first and second pressing portions can press the light tunnel from above the first and second lines respectively, whereby the light tunnel can be more stably held on the holding portion of the optical component holding member.

In the aforementioned projector according to the first aspect, the optical component holding member preferably further includes a wall portion provided on the holding portion for regulating the position of the light tunnel on at least one side in the extensional direction of the light tunnel. According to this structure, the light tunnel can be easily inhibited from shifting toward at least one side in the extensional direction of the light tunnel.

In the aforementioned projector according to the first aspect, the first pressing portion and the second pressing portion are preferably rendered elastically deformable in the pressing directions respectively. According to this structure, the first and second pressing portions can be so elastically deformed in the pressing directions as to press the first and second surfaces of the light tunnel respectively also when the first and second pressing portions are dispersed in working accuracy, whereby the light tunnel can be more stably held on the holding portion of the optical component holding member.

In the aforementioned projector according to the first aspect, the first pressing portion and the second pressing portion preferably linearly come into contact with and press the first surface and the second surface of the light tunnel in directions intersecting with the extensional direction of the light tunnel respectively. According to this structure, the light tunnel can be inhibited from jolting in the directions intersecting with the extensional direction thereof, to be more stably held on the holding portion of the optical component holding member.

A projector according to a second aspect of the present invention comprises a rectangular light tunnel having a hollow light guide path capable of passing light therethrough for shaping the light with the light guide path and further having first, second, third and fourth surfaces, an optical component holding member holding the light tunnel and a light tunnel clip including a mask portion for screening the outer periphery of an inlet of the light tunnel from the light for fixing the light tunnel to the optical component holding member, while the optical component holding member includes a holding portion holding the light tunnel, a first engaging hole and a second engaging hole so arranged as to hold the light tunnel therebetween, an opening for partially receiving the mask portion of the light tunnel clip, a positioning protrusion integrally provided on the optical component holding member for positioning the light tunnel clip by coming into contact with the mask portion of the light tunnel clip, projecting first and second support portions provided on the holding portion for supporting prescribed portions of the third and fourth surfaces of the light tunnel respectively, and an air inlet provided on the holding portion for cooling the light tunnel, the light tunnel clip includes a first pressing portion and a second pressing portion pressing first and second surfaces, adjacent to each other, of the light tunnel toward the holding portion of the optical component holding member respectively and a first engaging pawl and a second engaging pawl of a springy material engaging with the first engaging hole and the second engaging hole respectively, and the first pressing portion and the second pressing portion press positions of the first and second surfaces of the light tunnel located substantially on the same line perpendicular to the traveling direction of the light respectively.

The projector according to the second aspect of the present invention, provided with the light tunnel clip including the first and second pressing portions pressing the positions of the first and second surfaces of the light tunnel located substantially on the same line perpendicular to the traveling direction of the light as hereinabove described, can press the positions of the first and second surfaces of the light tunnel located substantially on the same line perpendicular to the traveling direction of the light with the first and second pressing portions, thereby suppressing deviation of positions subjected to pressing force acting on the first and second surfaces of the light tunnel along the traveling direction of the light. Thus, the light tunnel, stably held on the holding portion of the optical component holding member, can be inhibited from positional deviation resulting from vibration of a motor or the like.

According to the second aspect, the light tunnel clip is provided with the first and second engaging pawls engaging with the first and second engaging holes provided on the optical portion holding member respectively, whereby the light tunnel clip can be mounted on the optical component holding member by engaging the first and second engaging pawls of the light tunnel clip with the first and second engaging holes of the optical component holding member respectively. Thus, a step of mounting the light tunnel clip can be simplified as compared with a case of mounting the light tunnel clip on the optical component holding member through screws or the like, and the number of components can be reduced. Further, the first and second engaging pawls are composed of the springy material, whereby vibration of the light tunnel can be absorbed dissimilarly to a case of fixing the light tunnel clip to the optical component holding member with screws. In addition, the positioning protrusion is so integrally provided on the optical component holding member that the integrally provided positioning protrusion can be brought into contact with the mask portion of the light tunnel clip for positioning the light tunnel clip, whereby the light tunnel clip can be positioned without any additional component.

According to the second aspect, the optical component holding member is provided with the opening for partially receiving the mask portion of the light tunnel clip, whereby the mask portion of the light tunnel clip can be partially fitted into the opening of the optical component holding member, to be prevented from positional deviation resulting from dispersion in working accuracy for folding the mask portion. Thus, the mask portion can be prevented from interfering with a color wheel or the like, whereby the mask portion and the color wheel or the like can be prevented from breakage. Further, the holding portion of the optical component holding member is provided with the projecting first and second support portions for supporting the prescribed portions of the third and fourth surfaces of the light tunnel respectively so that the prescribed portions of the third and fourth surfaces of the light tunnel can be arranged on the projecting first and second support portions of the holding portion respectively, thereby forming spaces between the holding portion and the third and fourth surfaces of the light tunnel respectively. In this case, the optical component holding member is provided with the air inlet for cooling the light tunnel so that air introduced from the air inlet of the holding portion can flow through the spaces formed between the holding portion and the third and fourth surfaces of the light tunnel by the aforementioned first and second support portions respectively, whereby cooling efficiency for the light tunnel can be improved.

In the aforementioned projector according to the second aspect, the second engaging pawl of the light tunnel clip is preferably so formed as to nip an edge of the second engaging hole of the optical component holding member. According to this structure, the light tunnel clip can be inhibited from jolting with respect to the optical component holding member, whereby the light tunnel can be further inhibited from positional deviation.

In the aforementioned projector according to the second aspect, the light tunnel clip is preferably provided with two first pressing portions, and the two first pressing portions are preferably so formed as to press first and second sides of the first surface of the light tunnel along the extensional direction of the light tunnel toward the holding portion of the optical component holding member respectively. Thus, the light tunnel can be stably held on the holding portion of the optical component holding member due to the two first pressing portions pressing the first and second sides of the first surface of the light tunnel along the extensional direction of the light tunnel toward the holding portion of the optical component holding member respectively.

In this case, the light tunnel clip is preferably provided with two second pressing portions, the two second pressing portions are preferably so formed as to press first and second sides of the second surface of the light tunnel along the extensional direction of the light tunnel toward the holding portion of the optical component holding member respectively, the first pressing portion and the second pressing portion pressing the first sides along the extensional direction of the light tunnel respectively preferably press positions located on a first line perpendicular to the traveling direction of the light, and the first pressing portion and the second pressing portion pressing the second sides along the extensional direction of the light tunnel respectively preferably press positions located on a second line perpendicular to the traveling direction of the light. According to this structure, the first and second pressing portions can press the light tunnel from above the first and second lines respectively, whereby the light tunnel can be more stably held on the holding portion of the optical component holding member.

In the aforementioned projector according to the second aspect, the optical component holding member preferably further includes a wall portion provided on the holding portion for regulating the position of the light tunnel on at least one side in the extensional direction of the light tunnel. According to this structure, the light tunnel can be easily inhibited from shifting toward at least one side in the extensional direction of the light tunnel.

In the aforementioned projector according to the second aspect, the first pressing portion and the second pressing portion are preferably rendered elastically deformable in the pressing directions respectively. According to this structure, the first and second pressing portions can be so elastically deformed in the pressing directions as to press the first and second surfaces of the light tunnel respectively also when the first and second pressing portions are dispersed in working accuracy, whereby the light tunnel can be more stably held on the holding portion of the optical component holding member.

In the aforementioned projector according to the second aspect, the first pressing portion and the second pressing portion preferably linearly come into contact with and press the first surface and the second surface of the light tunnel in directions intersecting with the extensional direction of the light tunnel respectively. According to this structure, the light tunnel can be inhibited from jolting in the directions intersecting with the extensional direction thereof, to be more stably held on the holding portion of the optical component holding member.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

The structure of a projector 50 according to the embodiment of the present invention is described with reference to FIGS. 1 to 14.

Figure 1:
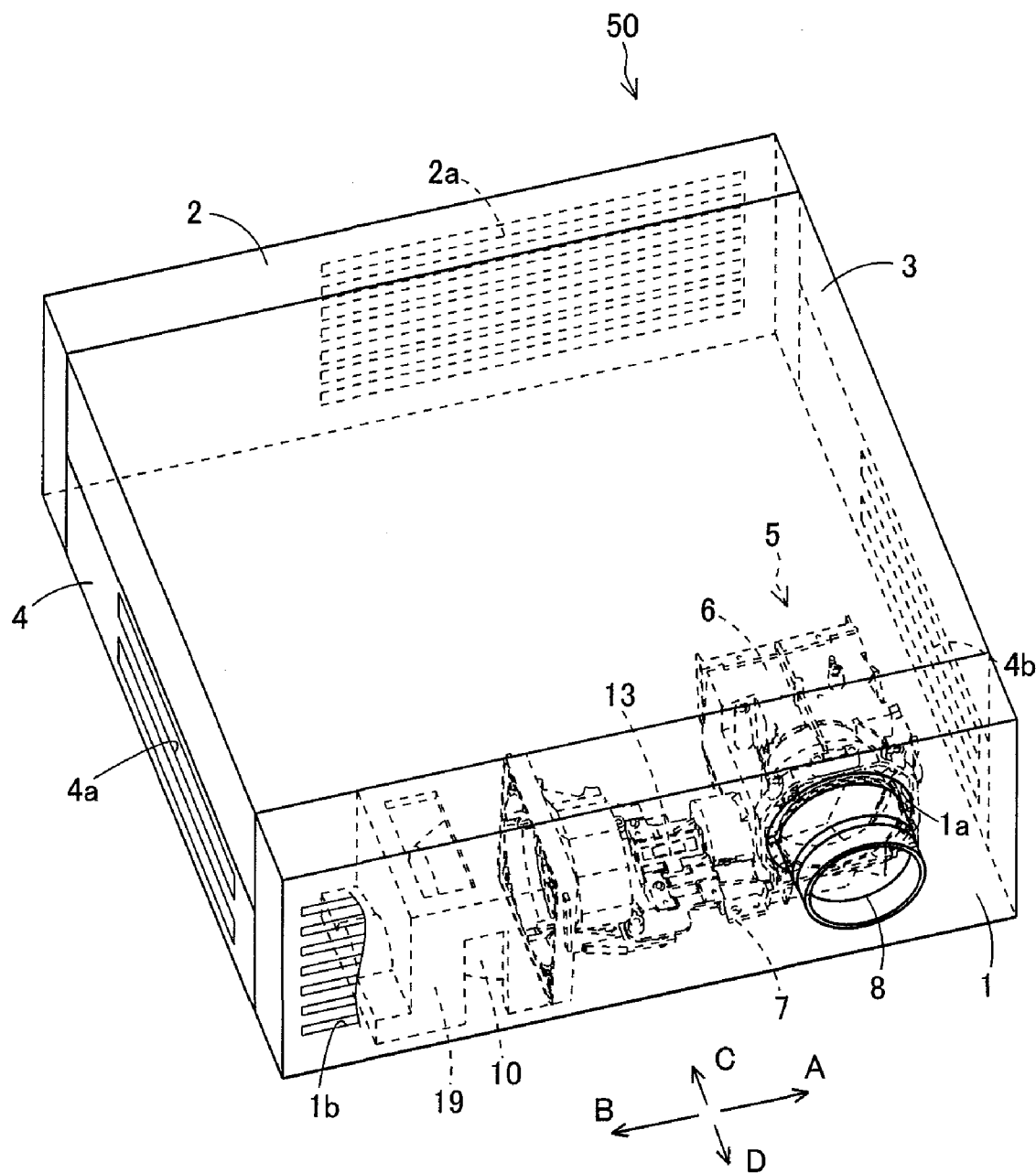
FIG. 1 is a perspective view showing the overall structure of a projector according to an embodiment of the present invention.
Figure 2:
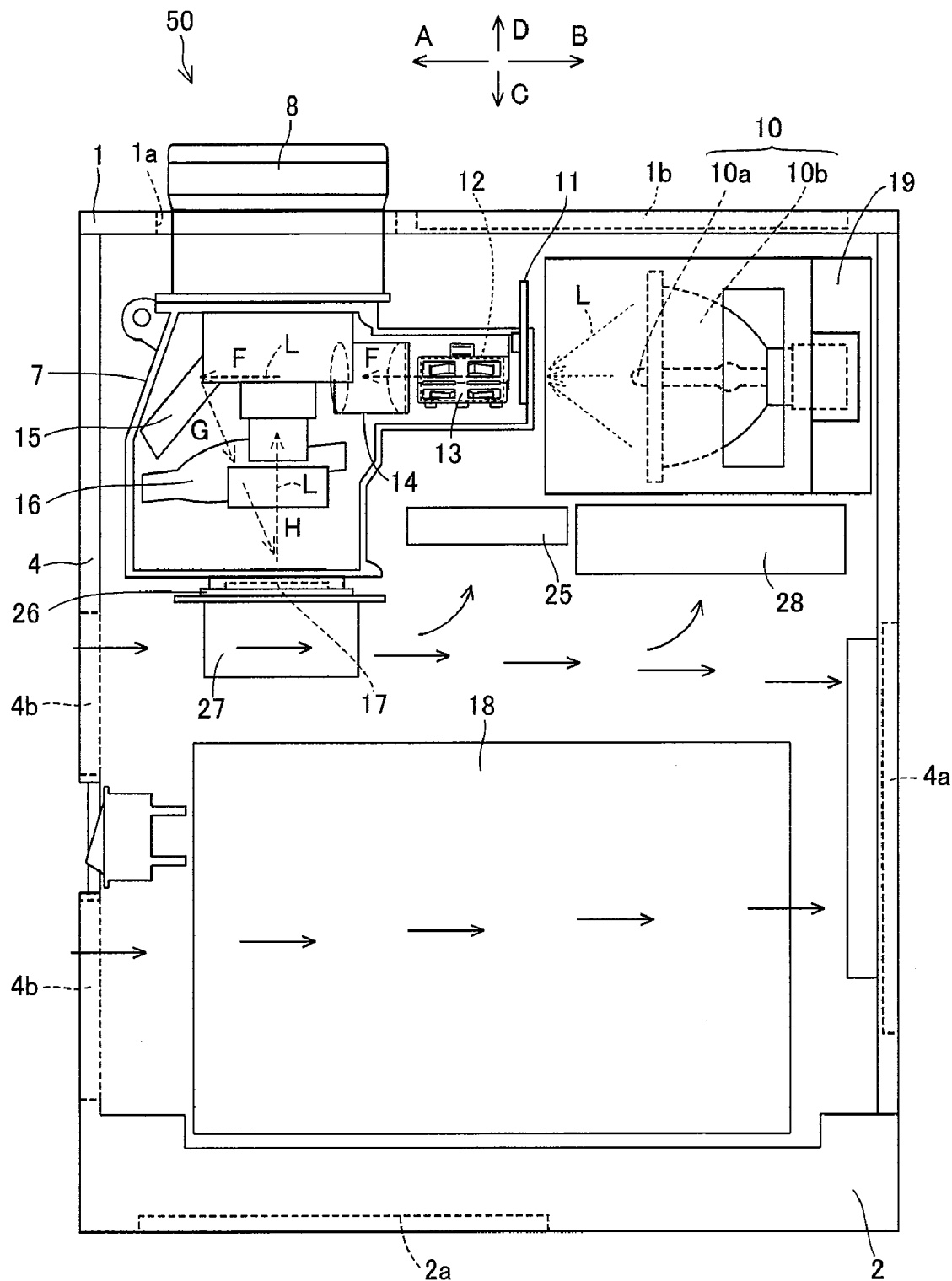
FIG. 2 is a plan view schematically showing the internal structure of the projector according to the embodiment of the present invention.

As shown in FIG. 1, a frame of the projector 50 according to the embodiment of the present invention includes a front frame 1, a rear frame 2, an upper frame 3 and a lower frame 4. A lens receiving portion 1a receiving a projection lens 8 for projecting images is formed on a portion of the front frame 1 closer to an end along arrow A. As shown in FIGS. 1 and 2, the front and lower frames 1 and 4 are provided with exhaust ports 1b and 4a on side surfaces along arrow B respectively. Further, the rear frame 2 and the lower frame 4 are provided with air suction holes 2a and 4b for cooling on side surfaces along arrow A respectively.

Figure 3:
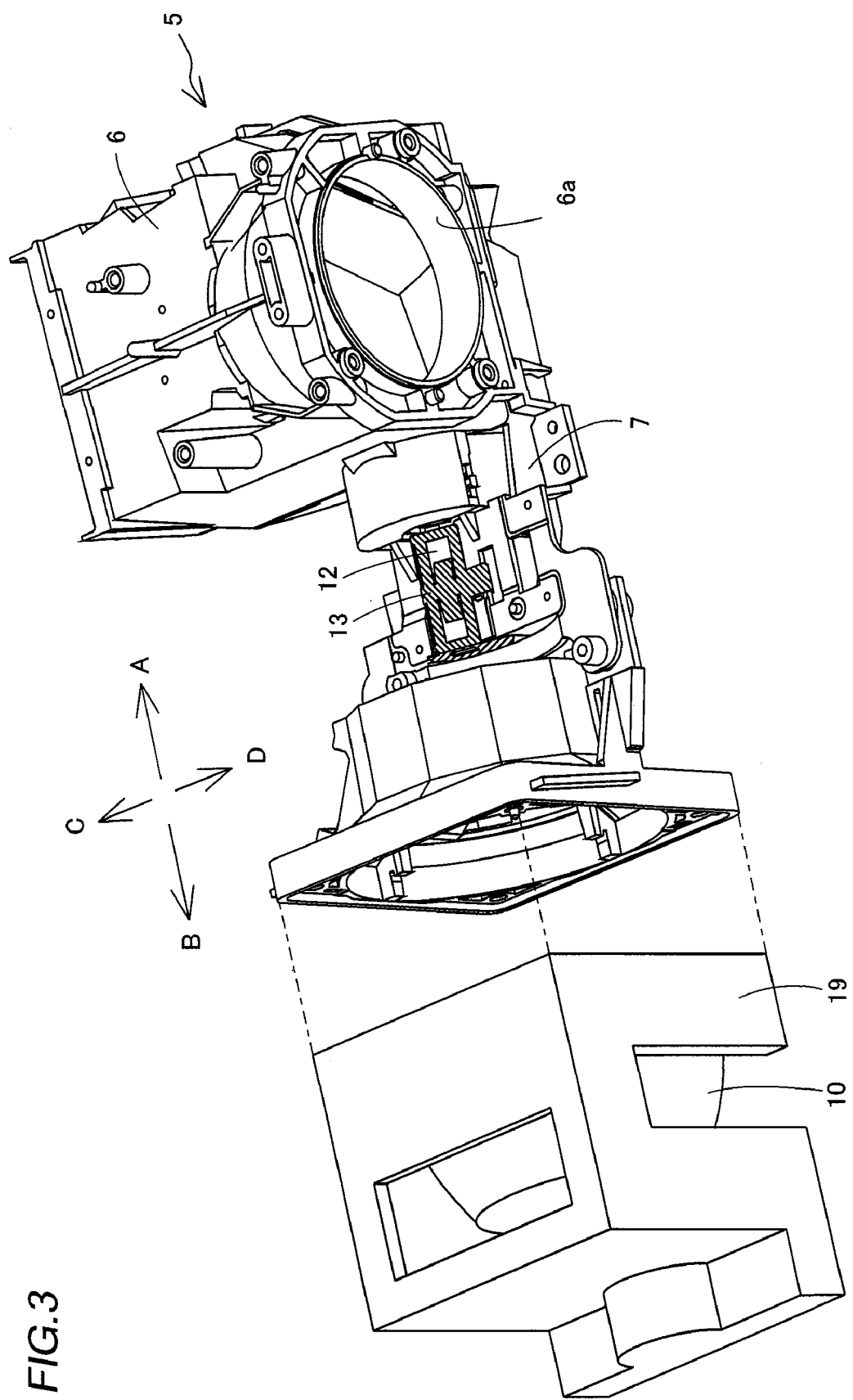
FIG. 3 is a perspective view showing the internal structure of the projector according to the embodiment of the present invention.
Figure 4:
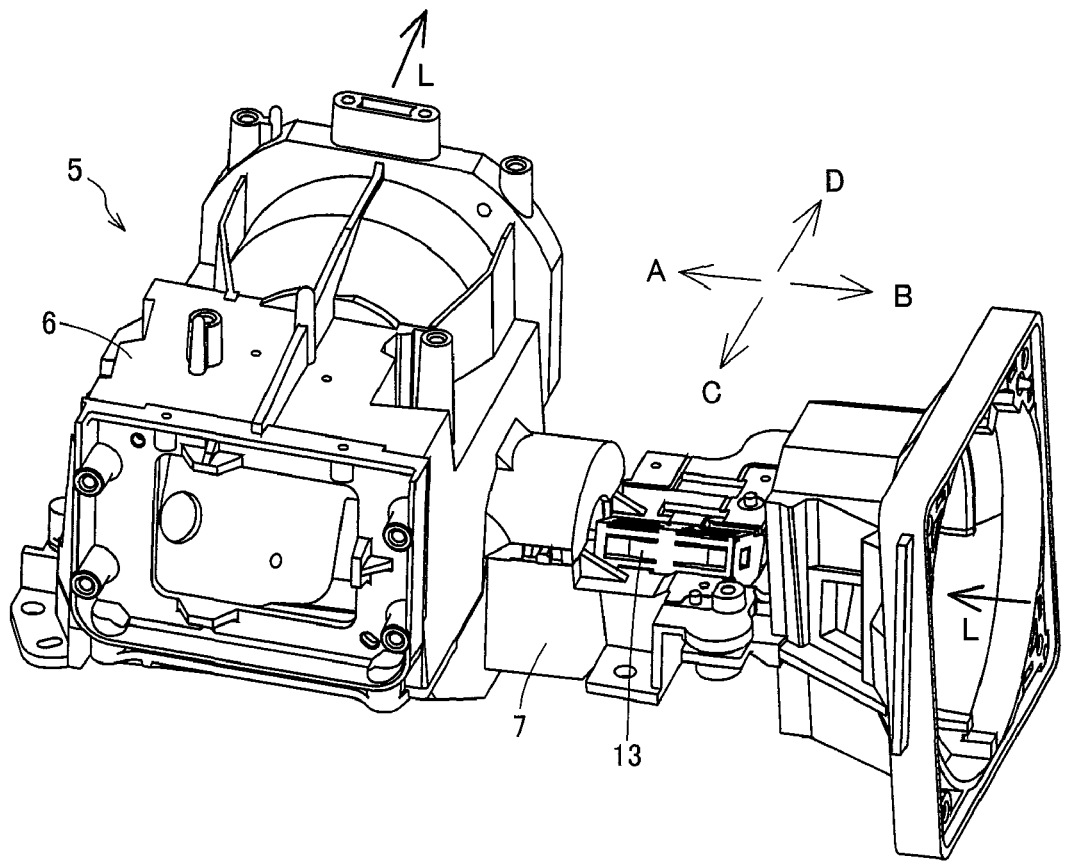
FIG. 4 is a perspective view partially illustrating the internal structure shown in FIG. 3 as viewed along arrow D.

A casting 5 of a metal (Mg) holding optical components is mounted on the lower frame 4, as shown in FIGS. 1, 3 and 4. This casting 5 is constituted of an upper casing 6 and a lower casting 7. The lower casting 7 is an example of the "optical component holding member" in the present invention. The upper casting 6 is provided with a lens mounting portion 6a mounted with the projection lens 8. The upper casting 6 holds a DMD (digital micromirror device) 17 described later.

Figure 5:
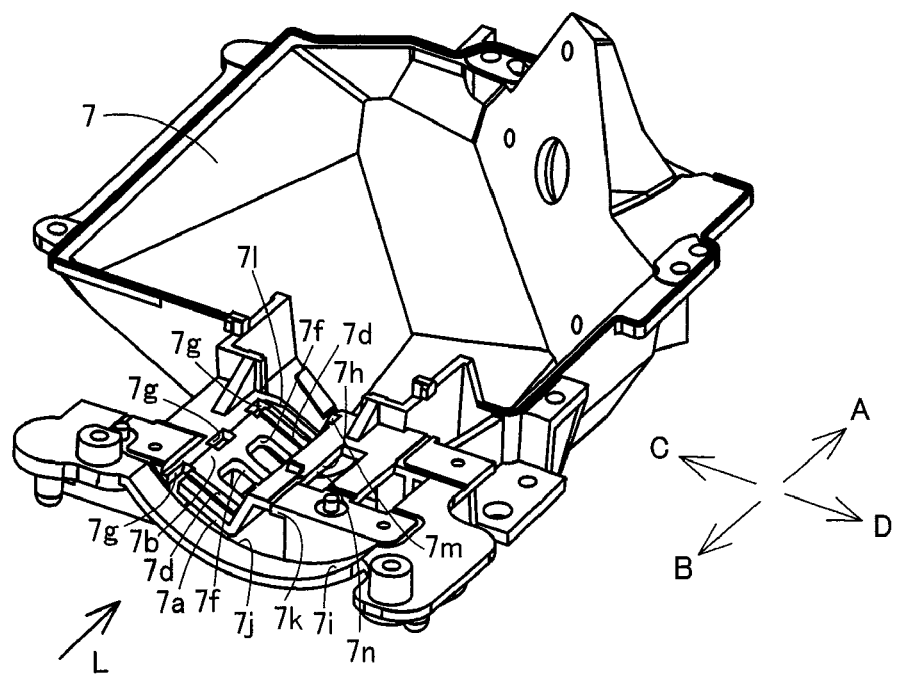
FIGS. 5 and 6 are perspective views of a lower casting of the projector according to the embodiment of the present invention.
Figure 6:
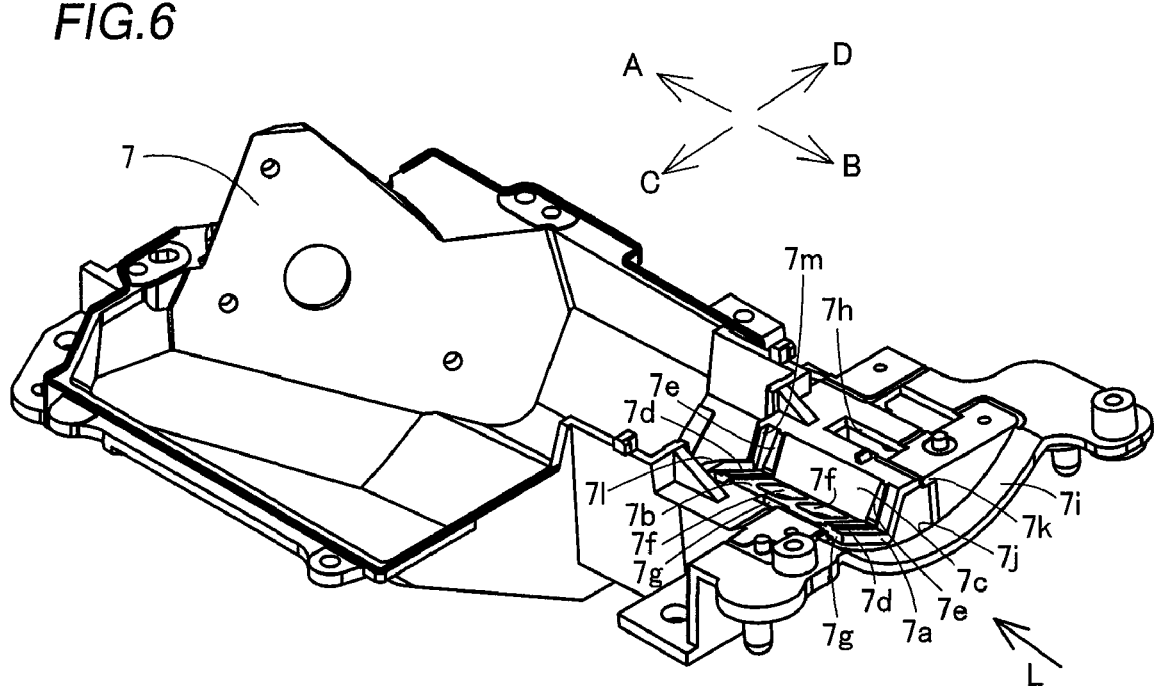
Figure 7:
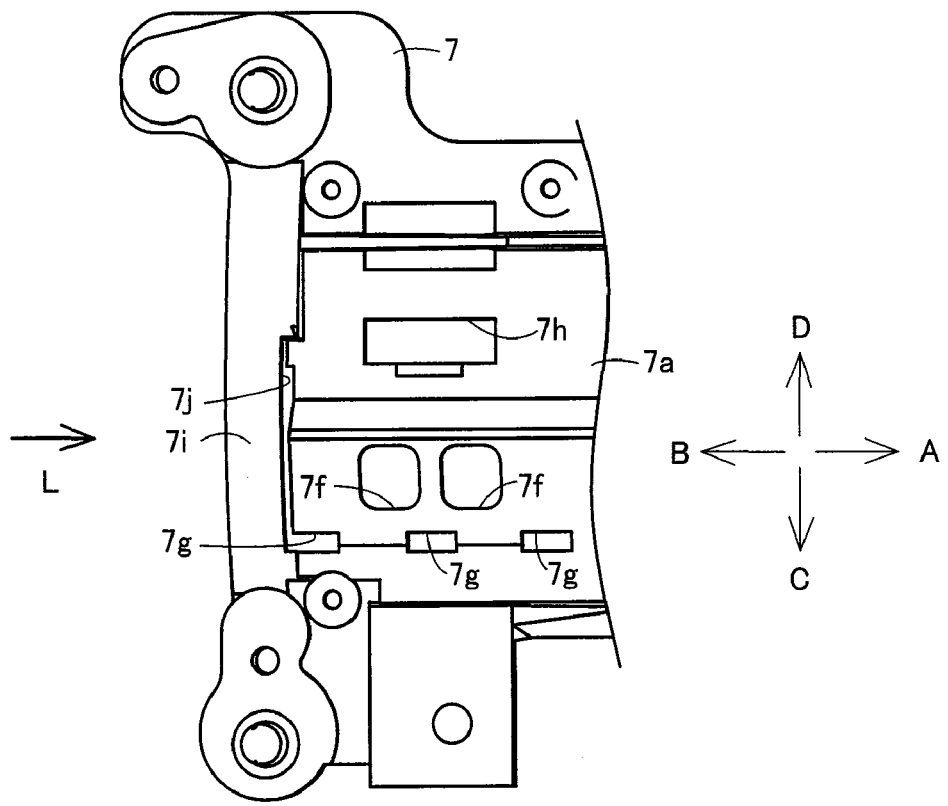
FIG. 7 is a bottom plan view of a portion around a holding portion of the lower casting of the projector according to the embodiment of the present invention.

As shown in FIGS. 5 and 6, a holding portion 7a having two supporting surfaces 7b and 7c holding two outer surfaces 22a and 23a (see FIG. 8) of a light tunnel 12 described later is formed on an end of the lower casting 7 along arrow B. The first supporting surface 7b is inclined by a prescribed angle from a horizontal plane, while the second supporting surface 7c is substantially perpendicular to the first supporting surface 7b. The two supporting surfaces 7b and 7c of the holding portion 7a are provided with pairs of projecting support portions 7d and 7e against which the light tunnel 12 is pressed respectively. The pairs of support portions 7d and 7e are arranged at prescribed intervals along arrows A and B respectively, to extend along arrows C and D. The support portions 7d are examples of the "first support portion" in the present invention, and the support portions 7e are examples of the "second support portion" in the present invention. As shown in FIGS. 5 and 7, two air inlets 7f for cooling the light tunnel 12 are formed on the supporting surface 7b of the holding portion 7a. Further, three engaging holes 7g engaging with three engaging pawls 13i of a light tunnel clip 13 described later are formed on an end of the supporting surface 7b of the holding portion 7a along arrow C. A further engaging hole 7h engaging with a hooked engaging pawl 13j of the light tunnel clip 13 described later is formed on a position of the upper surface of the lower casting 7 separated from the supporting surface 7c of the holding portion 7a at a prescribed interval along arrow D. The engaging holes 7g are examples of the "first engaging hole" in the present invention, and the engaging hole 7h is an example of the "second engaging hole" in the present invention. An arcuate recess portion 7i corresponding to a discoidal color wheel 11 described later is formed on an end of the lower casting 7 along arrow B. An opening 7j receiving a mask portion 13k of the light tunnel clip 13 described later is formed between the end of the holding portion 7a along arrow B and the recess portion 7i. The opening 7j is an example of the "opening for partially receiving the mask portion" in the present invention. A protrusion 7k for positioning the light tunnel clip 13 is formed in the vicinity of ends of the holding portion 7a of the lower casting 7 along arrows B and D. Wall portions 7l and 7m substantially perpendicular to the supporting surfaces 7b and 7c respectively are formed on ends of the supporting surfaces 7b and 7c along arrow A respectively. The wall portions 71 and 7m have functions of regulating movement of the light tunnel 12 along arrow A.

As shown in FIG. 2, the projector 50 comprises a source lamp 10, the color wheel 11, the light tunnel 12, the light tunnel clip 13, a lens group 14, a mirror 15, a lens 16, the DMD 17 and a printed board 18.

The source lamp 10 includes a bulb 10a serving as a light source and a reflector 10b for reflecting and condensing the light L emitted from the bulb 10a, as shown in FIG. 2. This source lamp 10 is stored in a box-type lamp case 19. A cooling fan 28 for cooling the source lamp 10 is arranged on the side of the source lamp 10 along arrow C. Air fed from the cooling fan 28 cools the source lamp 10, and is thereafter discharged from the exhaust port 1b of the front frame 1.

The color wheel 11 is rotatably arranged on the position where the reflector 10b condenses the light L emitted from the bulb 10a of the source lamp 10. This color wheel 11 has a function of adding colors (red, blue and green, for example) to the light L received from the source lamp 10.

Figure 8:
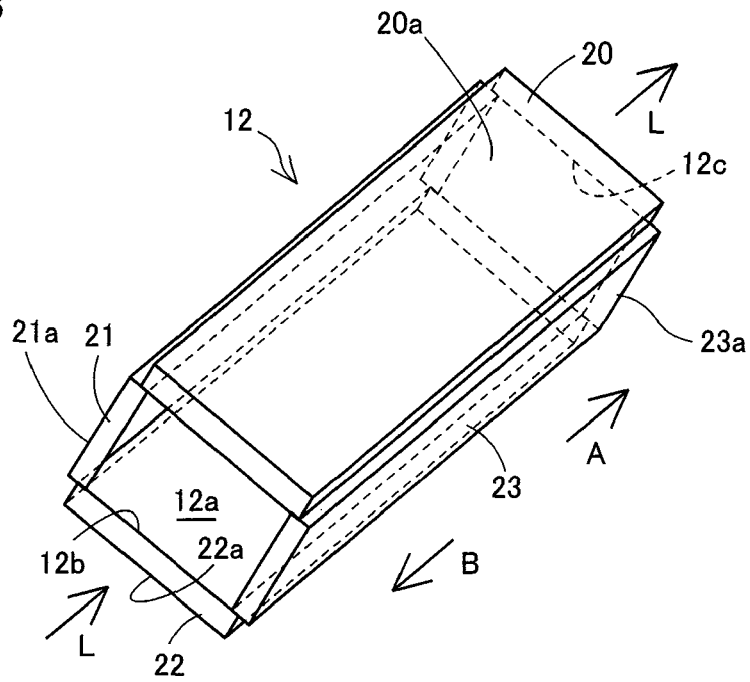
FIG. 8 is a perspective view of a light tunnel of the projector according to the embodiment of the present invention.
Figure 13:
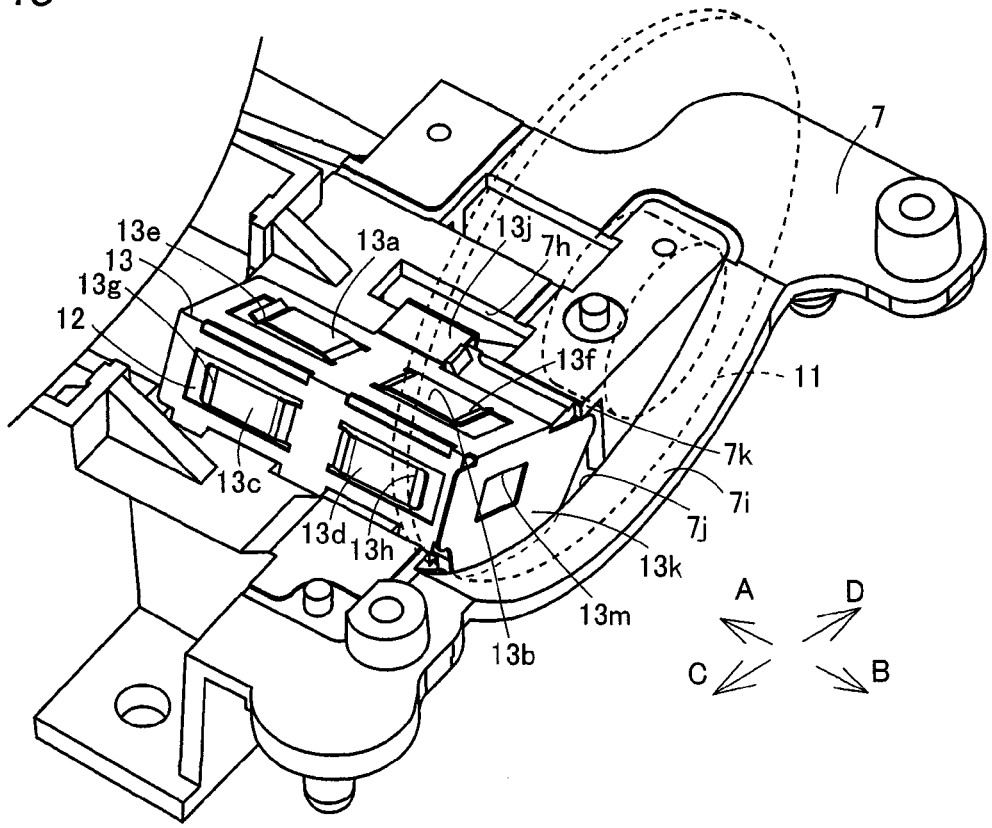
FIGS. 13 and 14 are perspective views showing the light tunnel clip mounted on the lower casting.

As shown in FIG. 2, the light tunnel 12 is opposed to the source lamp 10 through the color wheel 11. The light tunnel 12 and the color wheel 11 are so arranged that the interval therebetween is several mm (about 3 mm, for example), as shown in FIGS. 2 and 13. The light tunnel 12 is constituted of four glass plates 20, 21, 22 and 23, as shown in FIG. 8. The four glass plates 20, 21, 22 and 23 have outer surfaces 20a, 21a, 22a and 23a respectively. The outer surface 20a of the glass plate 20 is an example of the "first surface" in the present invention, and the outer surface 20b of the glass plate 21 is an example of the "second surface" in the present invention. Further, the outer surface 20c of the glass plate 22 is an example of the "third surface" in the present invention, and the outer surface 20d of the glass plate 23 is an example of the "fourth surface" in the present invention. The four glass plates 20 to 23 are assembled into a rectangular parallelepiped, for forming a hollow rectangular light guide path 12a. The inner surfaces of the four glass plates 20 to 23 constituting the light guide path 12a are coated with reflective films (not shown) of silver for uniformizing the light L. As shown in FIG. 8, a rectangular inlet 12b and a rectangular outlet 12c for the light L traveling along arrow A are provided on both ends of the light tunnel 12 respectively. In other words, the light tunnel 12 is so formed as to uniformize and rectangularly shape the light L transmitted through the color wheel 11 and reflected by the reflective films of the light guide path 12a of the light tunnel 12.

When the outer surfaces 22a and 23a of the glass plates 22 and 23 of the light tunnel 12 are arranged on the projecting support portions 7d and 7e formed on the supporting surfaces 7b and 7c of the holding portion 7a of the lower casting 7 respectively, the light tunnel clip 13 fixes the light tunnel 12. In this case, the projecting support portions 7d and 7e support the light tunnel 12 in a state not in contact with the supporting surfaces 7b and 7c of the holding portion 7a. Air fed from another cooling fan 25 arranged on the side of the light tunnel 12 along arrow C is introduced into the air inlets 7f of the lower casting 7 to flow through spaces formed between the supporting surfaces 7b and 7c of the holding portion 7a and the glass plates 22 and 23 of the light tunnel 12 respectively, thereby cooling the light tunnel 12. After cooling the light tunnel 12, the air is discharged from the exhaust port 1b of the front frame 1.

Figure 9:
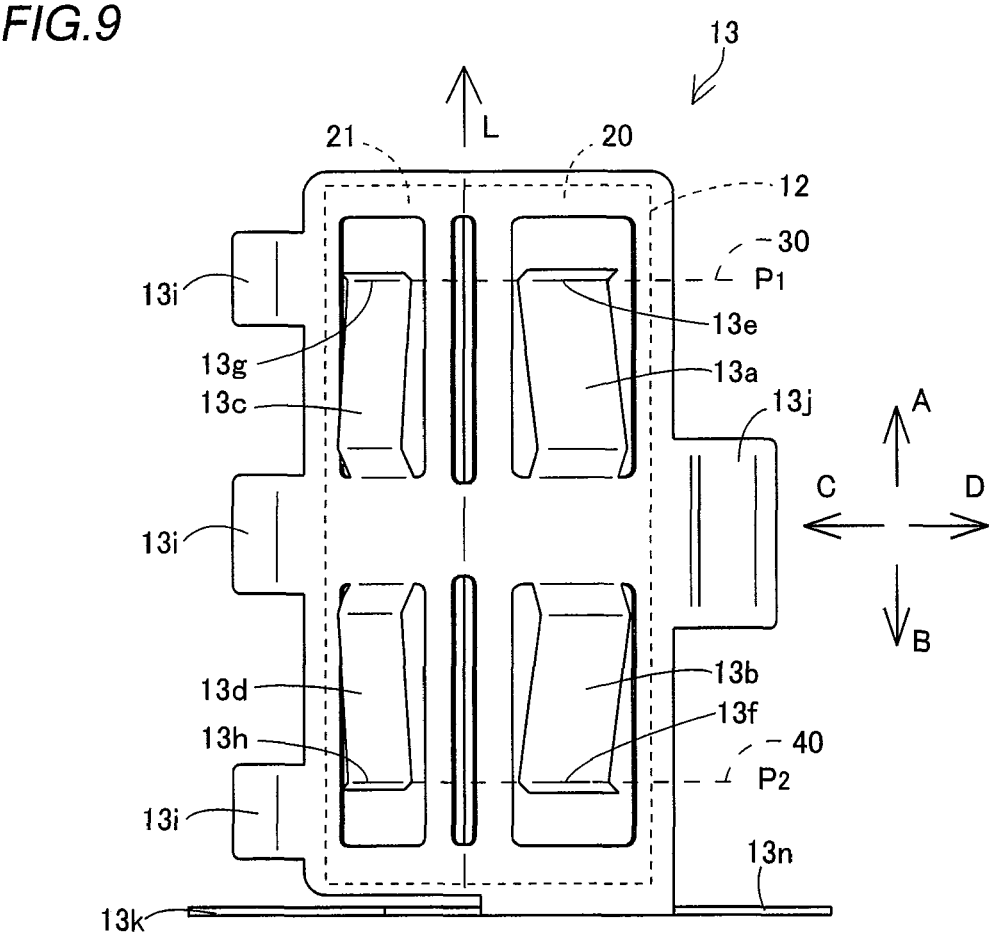
FIG. 9 is a plan view of a light tunnel clip of the projector according to the embodiment of the present invention.
Figure 10:
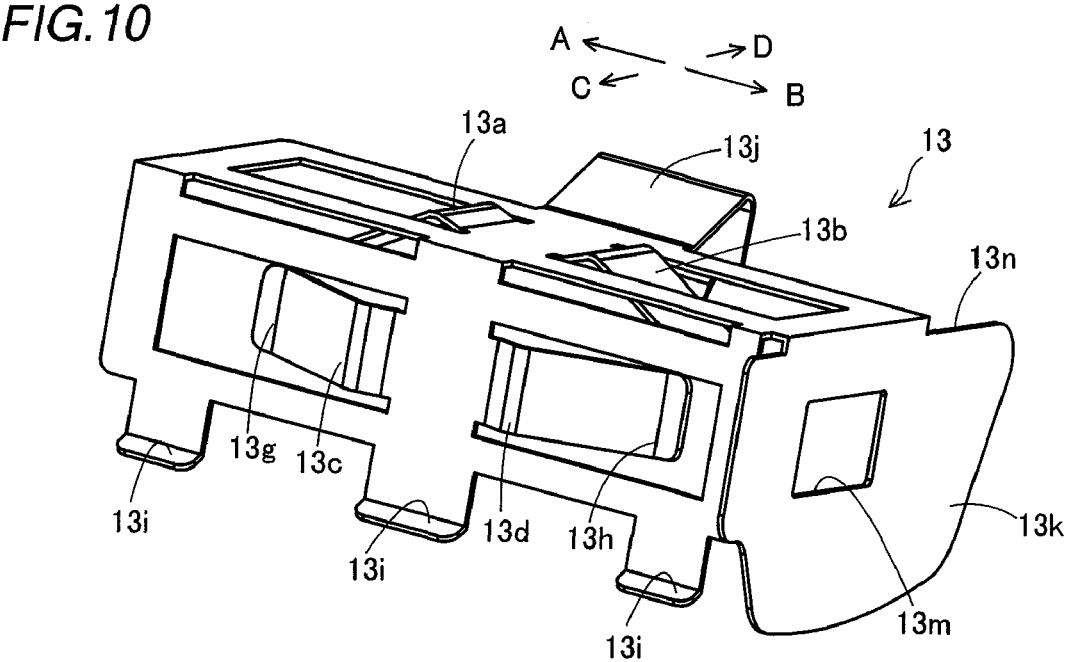
FIGS. 10 and 11 are perspective views of the light tunnel clip of the projector according to the embodiment of the present invention.
Figure 11:
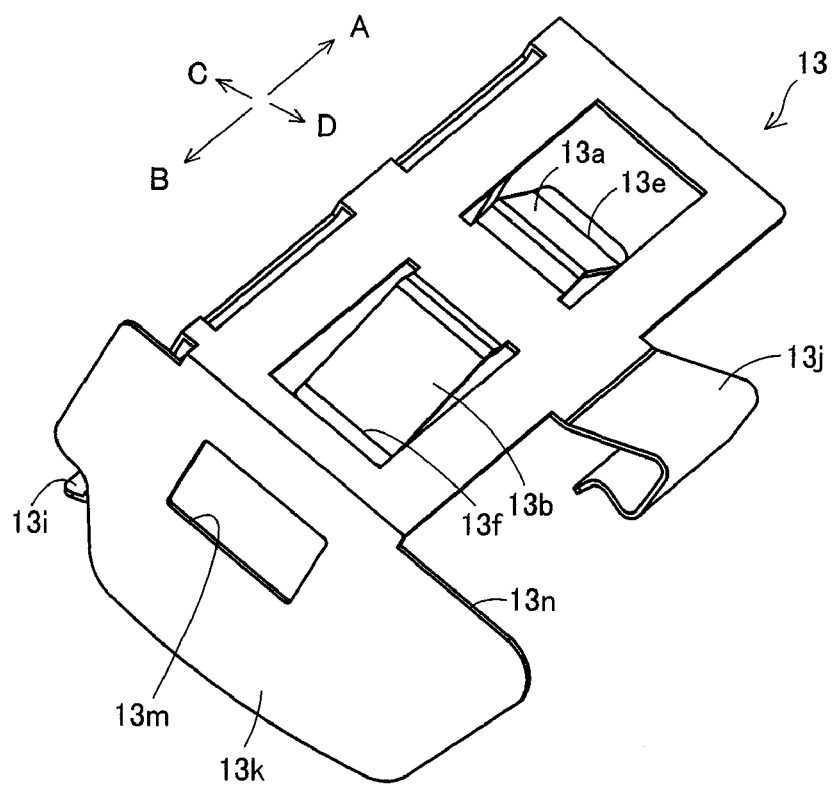

According to this embodiment, the light tunnel clip 13 is formed by an elastically deformable platelike member of springy stainless steel. Further, the light tunnel clip 13 is provided with plate spring portions 13a, 13b, 13c and 13d, as shown in FIGS. 9 to 11. Pressing portions 13e, 13f, 13g and 13h for pressing the outer surfaces 20a and 21a of the two adjacent glass plates 20 and 21 toward the holding portion 7a of the lower casting 7 are formed on the forward ends of the plate spring portions 13a, 13b, 13c and 13d respectively. The pressing portions 13e and 13f are examples of the "first pressing portion" in the present invention, and the pressing portions 13g and 13h are examples of the "second pressing portion" in the present invention. The pressing portions 13e and 13f are so formed as to press the outer surface 20a of the glass plate 20 of the light tunnel 12 toward the pair of support portions 7d (see FIG. 5) of the holding portion 7a of the lower casting 7. On the other hand, the pressing portions 13g and 13h are so formed as to press the outer surface 21a of the glass plate 21 of the light tunnel 12 toward the pair of support portions 7e (see FIG. 6) of the holding portion 7a of the lower casting 7.

Figure 14:
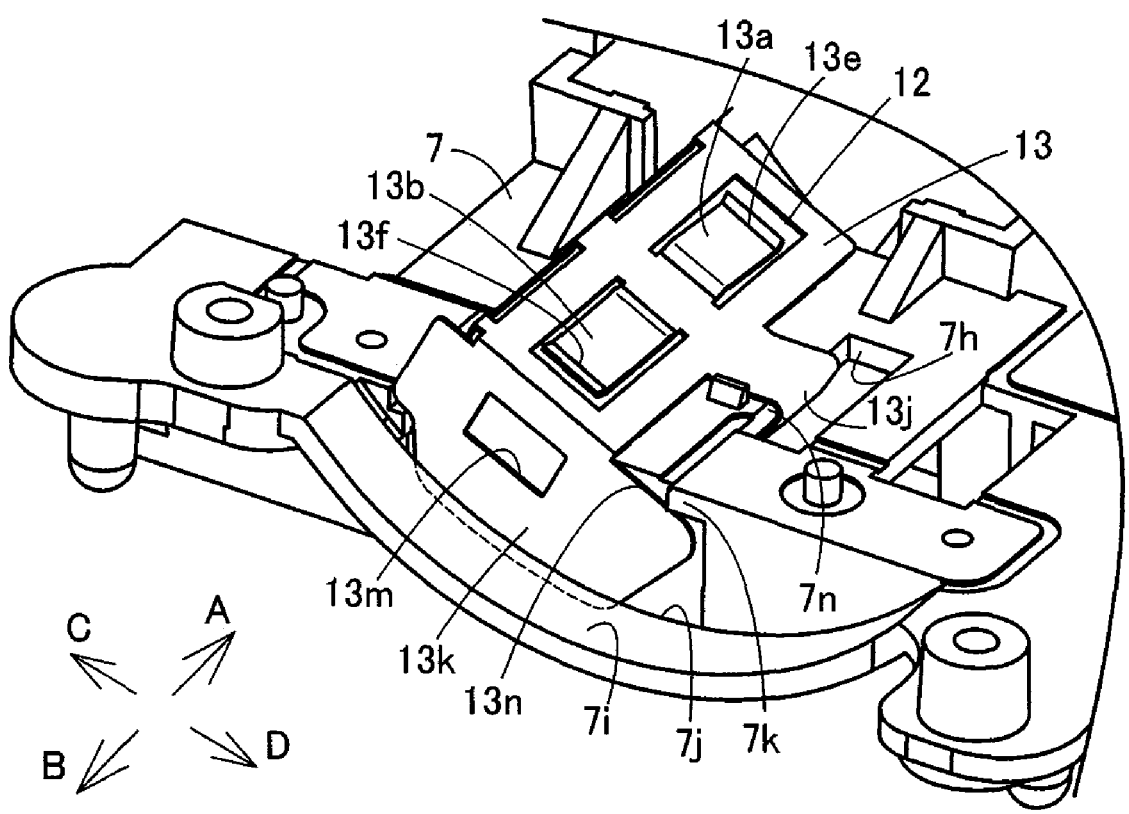

When the light tunnel clip 13 is mounted on the lower casting 7 for fixing the light tunnel 12 thereto as shown in FIGS. 13 and 14, the pressing portions 13e and 13g of the light tunnel clip 13 are located on positions P1 of the same line 30 perpendicular to the traveling direction of the light L respectively, as shown in FIG. 9. Therefore, the pressing portions 13e and 13g have functions of pressing the positions P1 of the outer surfaces 20a and 21a of the glass plates 20 and 21 located on the same line 30 perpendicular to the traveling direction of the light L respectively. The line 30 is an example of the "first line" in the present invention. When the light tunnel clip 13 is mounted on the lower casting 7, further, the pressing portions 13f and 13h are located on positions P2 of the same line 40 perpendicular to the traveling direction of the light L respectively. Therefore, the pressing portions 13f and 13h have functions of pressing the positions P2 of the outer surfaces 20a and 21a of the glass plates 20 and 21 located on the line 40 perpendicular to the traveling direction of the light L respectively. The line 40 is an example of the "second line" in the present invention.

Figure 12:
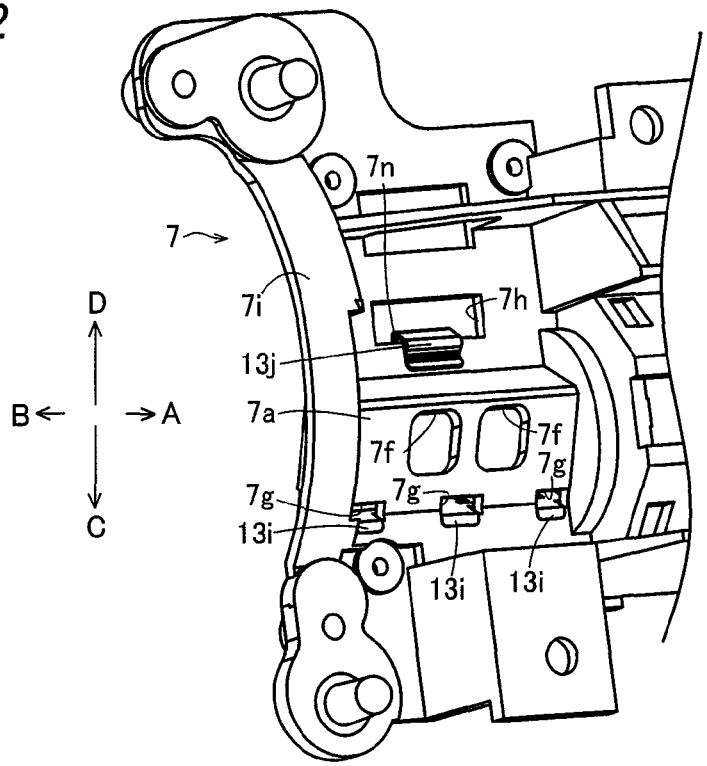
FIG. 12 is a perspective view showing the bottom surface of the portion around the holding portion of the lower casting mounted with the light tunnel clip shown in FIG. 11.
Figure 15:
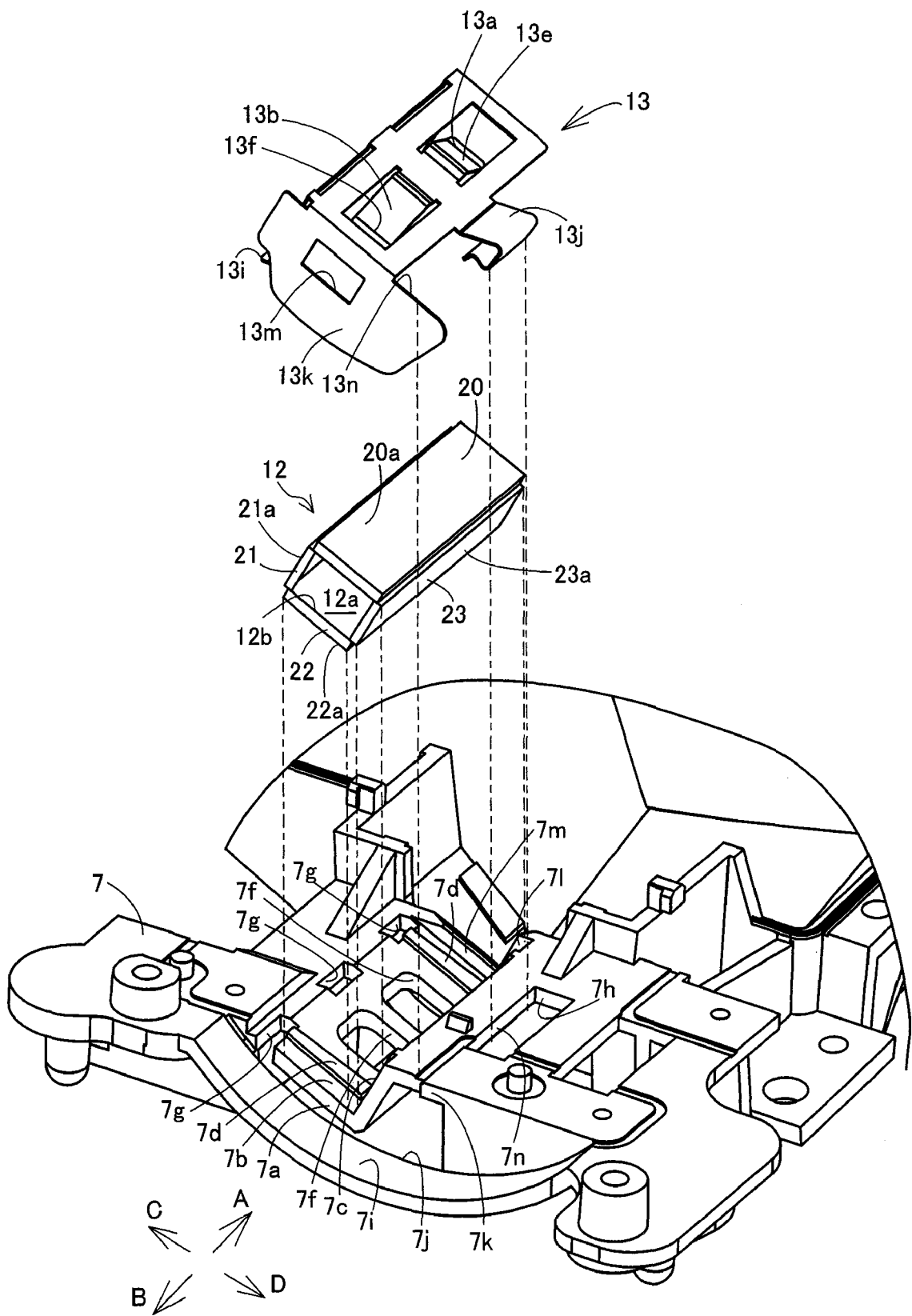
FIGS. 15 and 16 are exploded perspective views partially showing the light tunnel clip, the light tunnel and the lower casting.
Figure 16:
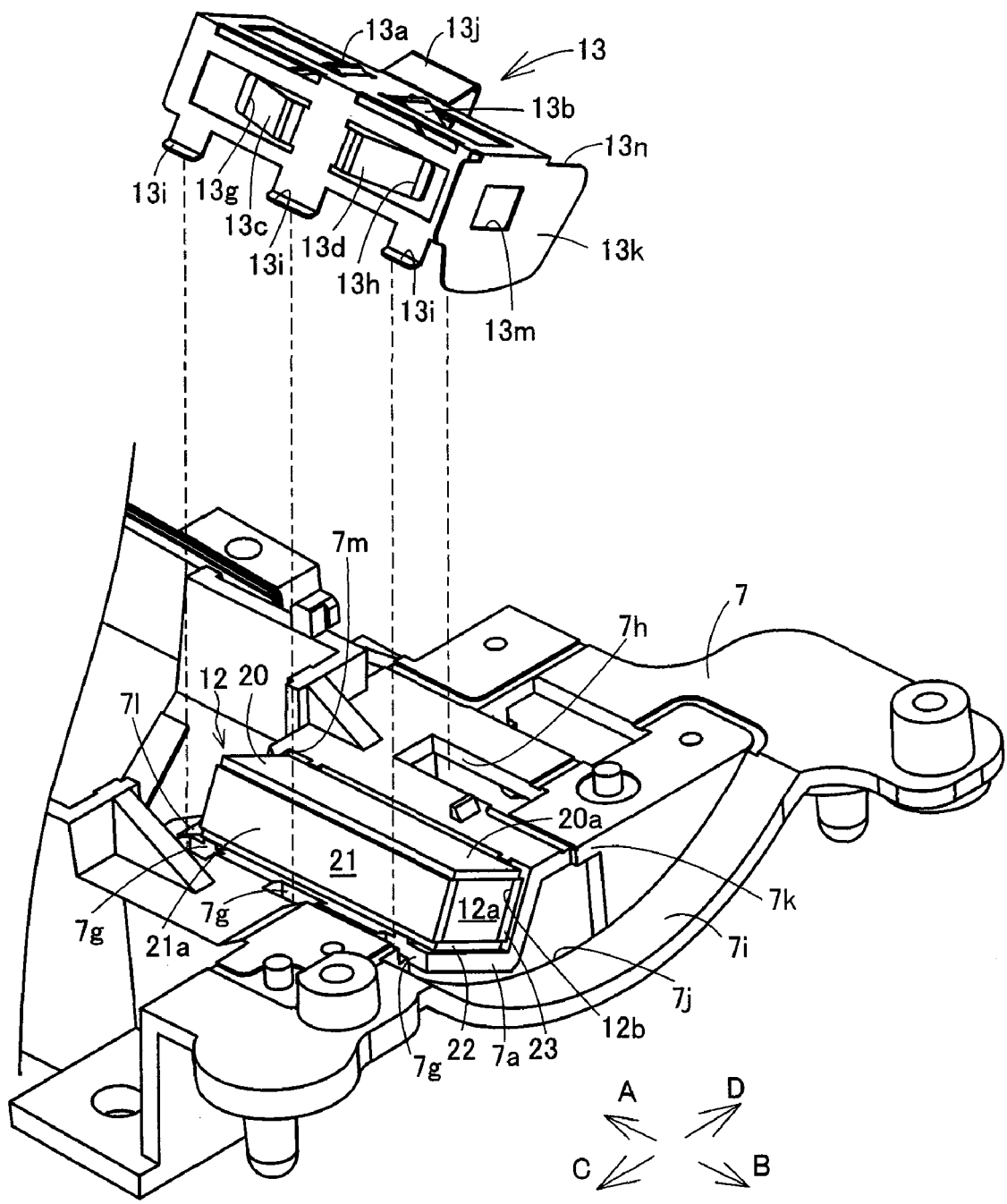
Figure 17:
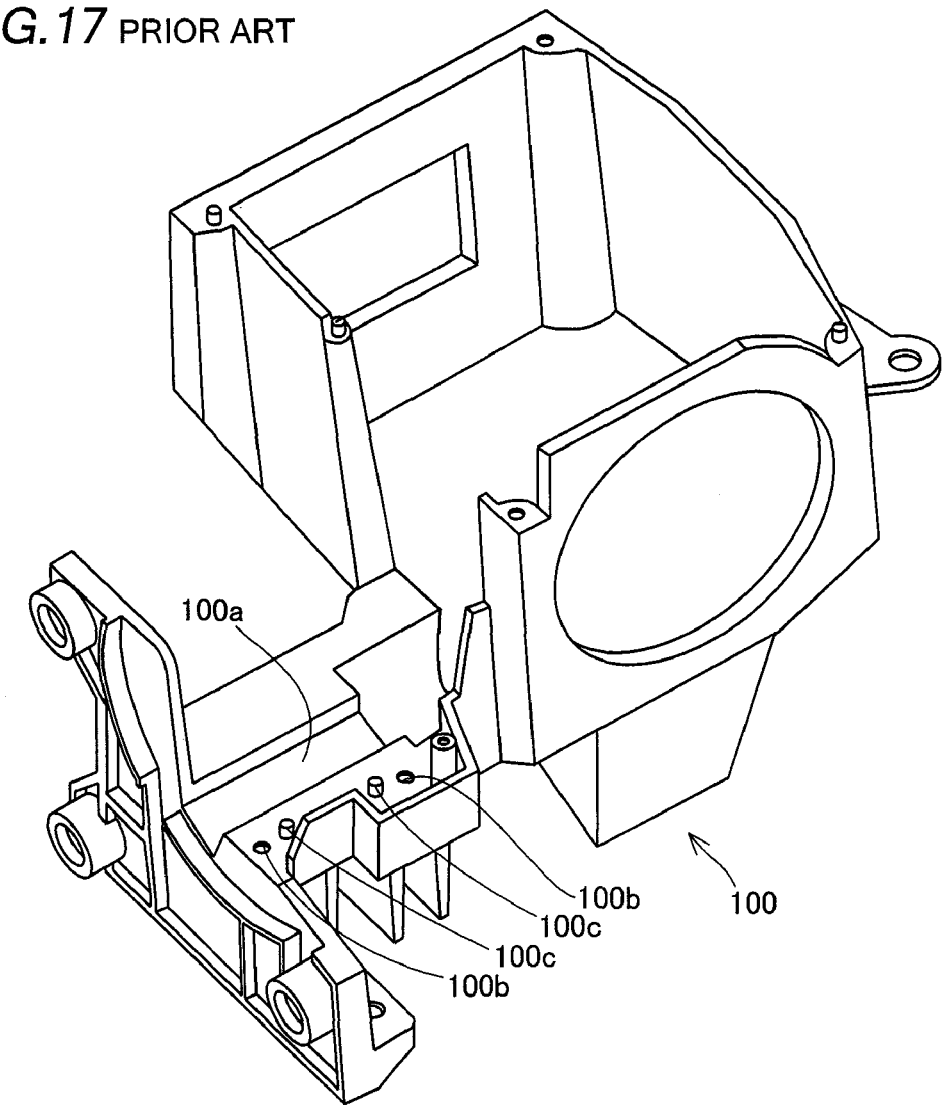
FIG. 17 is a perspective view of a casting mounted with a light tunnel in a conventional projector.
Figure 18:
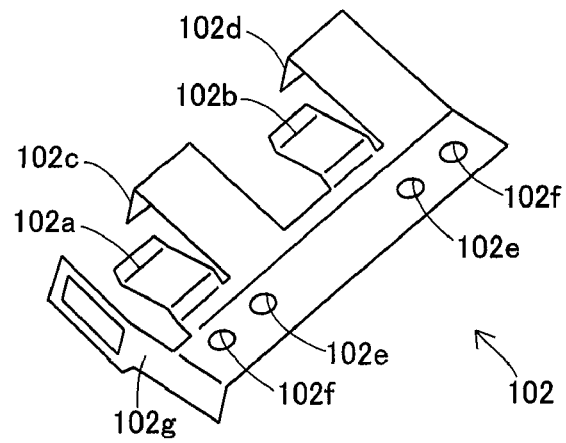
FIG. 18 is a perspective view of a light tunnel clip in the conventional projector.
Figure 19:
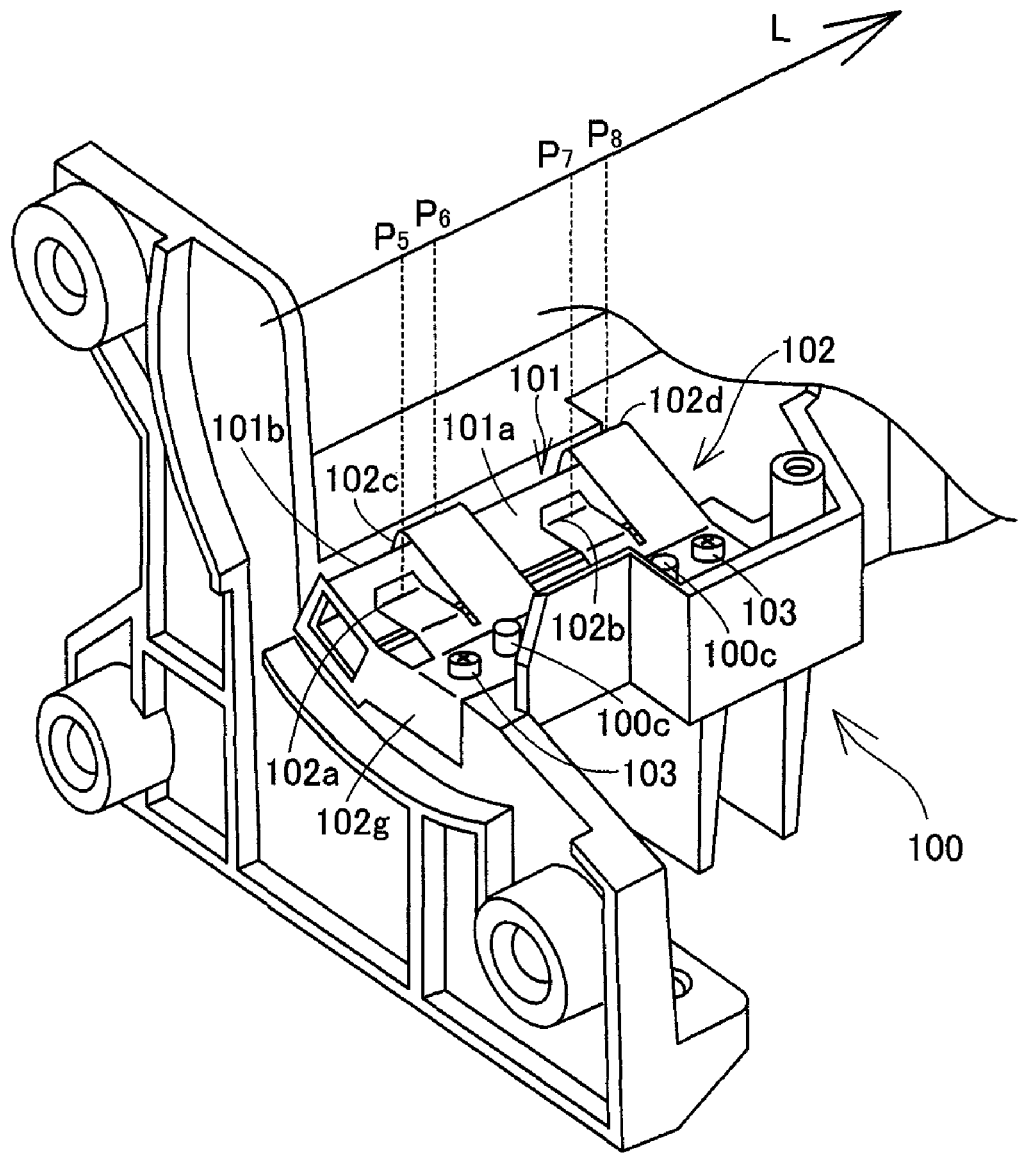
FIG. 19 is a perspective view showing the light tunnel clip mounted on the casting in the conventional projector.

According to this embodiment, the three engaging pawls 13i engaging with the engaging holes 7g of the lower casting 7 are formed on an end of the light tunnel clip 13 along arrow C, as shown in FIG. 10. The three engaging pawls 13i have outwardly bent forward ends. Further, the hooked engaging pawl 13j engaging with the engaging hole 7h of the lower casting 7 is formed on another end of the light tunnel clip 13 along arrow D, as shown in FIG. 11. This engaging pawl 13j is so formed as to nip an edge 7n of the engaging hole 7h of the lower casting 7. The engaging pawls 13i are examples of the "first engaging pawl" in the present invention, and the engaging pawl 13j is an example of the "second engaging pawl" in the present invention. These engaging pawls 13i and 13j are rendered elastically deformable. When the light tunnel clip 13 is mounted on the lower casting 7 for fixing the light tunnel 12 thereto as shown in FIGS. 13 and 14, the engaging pawl 13j engages with the engaging hole 7h of the lower casting 7 as shown in FIGS. 12 and 15 while the three engaging pawls 13i engage with the three engaging holes 7g of the lower casting 7 as shown in FIGS. 12 and 16.

According to this embodiment, the mask portion 13k is formed on still another end of the light tunnel clip 13 along arrow B. The mask portion 13k is provided with a rectangular opening 13m corresponding to the inlet 12b of the light tunnel 12. Therefore, the mask portion 13k can prevent the surface of the light tunnel 12 from incidence of the light L by partially passing the light L emitted from the source lamp 10 only through the inlet 12b of the light tunnel 12 and blocking the remaining light progressing toward the outer periphery of the light tunnel 12. An upper end 13n of the mask portion 13k along arrow B comes into contact with the protrusion 7k of the lower casting 7 for positioning the light tunnel clip 13, thereby regulating upward movement of the light tunnel clip 13. When the light tunnel clip 13 is mounted on the lower casting 7 as shown in FIG. 13, the lower end of the mask portion 13k is fitted into the opening 7j of the lower casting 7, so that the mask portion 13k does not interfere with the color wheel 11 due to positional deviation resulting from dispersion in working accuracy for folding the mask portion 13k.

As shown in FIG. 2, the lens group 14, arranged on the side of the outlet 12c of the light tunnel 12, has a function of forming images on the DMD 17. The mirror 15 has a function of condensing the light L transmitted through the lens group 14 on the lens 16. This DMD 17 has a large number of reflecting portions on the surface thereof, for varying these reflecting portions with image signals and forming images in response to presence/absence of reflected light. The printed board 26 is mounted on the DMD 17, for controlling the DMD 17. A heat sink member 27 is mounted on the printed board 26 for radiating heat from the DMD 17.

Operations of the projector 50 according to this embodiment are now described with reference to FIG. 2. First, the reflector 10b of the source lamp 10 condenses the light L emitted from the bulb 10a of the source lamp 10, as shown in FIG. 2. Thereafter the color wheel 11 colors the light L, which in turn is introduced into the light guide path 12a through the inlet 12b of the light tunnel 12. Then, the light L is rectangularly shaped by the light guide path 12a of the light tunnel 12 to travel along arrow F, transmitted through the lens group 14 and reflected by the mirror 15. The light L reflected by the mirror 15 travels along arrow G, to be transmitted through the lens 16 and introduced into the DMD 17. Thus, the light L corresponding to images formed by the DMD 17 travels along arrow H, and the projection lens 8 enlarges the images and projects the same on a screen or the like.

According to this embodiment, the projector 50, provided with the light tunnel clip 13 including the pressing portions 13e and 13g (13f and 13h) pressing the positions P1 (P2) of the outer surfaces 20a and 21a of the two glass plates 20 and 21 of the light tunnel 12 located on the substantially same line 30 (40) perpendicular to the traveling direction of the light L respectively as hereinabove described, can press the positions P1 (P2) of the outer surfaces 20a and 21a of the two glass plates 20 and 21 of the light tunnel 12 located on the substantially same line 30 (40) perpendicular to the traveling direction of the light L with the pressing portions 13e and 13g (13f and 13h) respectively, thereby suppressing deviation of positions subjected to pressing force acting on the outer surfaces 20a and 21b of the glass plates 20 and 21 of the light tunnel 12 along the traveling direction of the light L. Thus, the light tunnel 12, stably held on the holding portion 7a of the lower casting 7, can be inhibited from positional deviation resulting from vibration of motors etc. of the cooling fans 25 and 28.

According to this embodiment, as hereinabove described, the light tunnel clip 13, provided with the three engaging pawls 13i and the hooked engaging pawl 13j engaging with the three engaging holes 7g and the engaging hole 7h formed on the lower casting 7 respectively, can be mounted on the lower casting 7 by engaging the three engaging pawls 13i and the hooked engaging pawl 13j with the three engaging holes 7g and the engaging hole 7h respectively. Thus, a step of mounting the light tunnel clip 13 can be simplified as compared with a case of mounting the light tunnel clip 13 on the lower casting 7 through screws or the like, and the number of components can be reduced. Further, the engaging pawls 13i and 13j are composed of the springy material to be elastically deformable, whereby vibration of the light tunnel 12 can be absorbed dissimilarly to a case of fixing the light tunnel clip 13 to the lower casting 7 with screws. In addition, the positioning protrusion 7k is so integrally provided on the lower casting that the integrally provided positioning protrusion 7k can be brought into contact with the upper end 13n of the mask portion 13k of the light tunnel clip 13 for upwardly positioning the light tunnel clip 13, whereby the light tunnel clip 13 can be positioned without any additional component.

According to the aforementioned embodiment, the lower casting 7 is provided with the opening 7j capable of receiving the mask portion 13k of the light tunnel clip 13, whereby the mask portion 13k of the light tunnel clip 13 can be partially fitted into the opening 7j of the lower casting 7, to be prevented from positional deviation resulting from dispersion in working accuracy for folding the mask portion 13k. Thus, the mask portion 13k and the color wheel 11 arranged at the interval of several mm can be prevented from interfering with each other, to be prevented from breakage. Further, The holding portion 7a of the lower casting 7 is provided with the projecting support portions 7d and 7e supporting prescribed portions of the outer surfaces 22a and 23a of the glass plates 22 and 23 of the light tunnel 12 respectively so that the prescribed portions of the outer surfaces 22a and 23a of the glass plates 22 and 23 of the light tunnel 12 can be arranged on the projecting support portions 7d and 7e of the holding portion 7a of the lower casting 7 respectively, thereby forming spaces between the supporting surfaces 7b and 7c of the holding portion 7 and the glass plates 22 and 23 of the light tunnel 12 respectively. In addition, the supporting surface 7b of the holding portion 7a is so provided with the air inlets 7f that air introduced from the air inlets 7f of the holding portion 7a can flow through the spaces formed between the holding portion 7a and the glass plates 22 and 23 of the light tunnel 12 by the support portions 7d and 7e respectively, whereby cooling efficiency for the light tunnel 12 can be improved.

According to the aforementioned embodiment, the pressing portions 13e and 13f of the light tunnel clip 13 are so formed as to press first and second sides of the glass plate 20 of the light tunnel 12 along the extensional direction of the light tunnel 12 toward the holding portion 7a of the lower casting 7 respectively, whereby the light tunnel 12 can be stably held on the holding portion 7a of the lower casting 7.

According to the aforementioned embodiment, the pressing portions 13g and 13h of the light tunnel clip 13 are so formed as to press first and second sides of the glass plate 21 of the light tunnel 12 along the extensional direction of the light tunnel 12 toward the holding portion 7a of the lower casting 7 respectively, whereby the light tunnel 12 can be stably held on the holding portion 7a of the lower casting 7. Further, the pressing portions 13e and 13g press the positions P1 located on the line 30 perpendicular to the traveling direction of the light L respectively while the pressing portions 13f and 13h press the positions P2 located on the line 40 perpendicular to the traveling direction of the light L respectively so that the pressing portions 13e, 13f, 13g and 13h can press the light tunnel 12 from above the two lines 30 and 40, whereby the light tunnel 12 can be more stably held on the holding portion 7a of the lower casting 7.

According to the aforementioned embodiment, the holding portion 7a of the lower casting 7 is provided with the wall portions 7l and 7m regulating the position of the light tunnel 12 along arrow A in the extensional direction thereof, whereby the light tunnel 12 can be easily inhibited from shifting along arrow A in the extensional direction thereof.

According to the aforementioned embodiment, the pressing portions 13e, 13f, 13g and 13h, rendered elastically deformable in the directions for pressing the light tunnel 12 respectively, can be so elastically deformed in the directions for pressing the light tunnel 12 as to press the outer surfaces 20a and 21a of the glass plates 20 and 21 of the light tunnel 12 respectively also when the pressing portions 13e, 13f, 13g and 13h are dispersed in working accuracy, whereby the light tunnel 12 can be more stably held on the holding portion 7a of the lower casting 7.

According to the aforementioned embodiment, the pressing portions 13e, 13f, 13g and 13h linearly come into contact with the outer surfaces 20a and 21a of the glass plates 20 and 21 of the light tunnel 12 in the directions (along arrows C and D) intersecting with the extensional direction of the light tunnel 12 respectively for inhibiting the light tunnel 12 from jolting in the directions (along arrows C and D) intersecting with the extensional direction thereof, whereby the light tunnel 12 can be more stably held on the holding portion 7a of the lower casting 7.

Although the present invention has been described and illustrated in detail, it is clearly understood that the same is by way of illustration and example only and is not to be taken by way of limitation, the spirit and scope of the present invention being limited only by the terms of the appended claims.

For example, while the light tunnel clip 13 has the four pressing portions 13e, 13f, 13g and 13h in the aforementioned embodiment, the present invention is not restricted to this but the light tunnel clip 13 may alternatively be provided with two or at least six pressing portions for pressing positions of different surfaces of the light tunnel 12 located on the same line(s) perpendicular to the traveling direction of the light L respectively.

While the engaging pawls 13i and 13j of the light tunnel clip 13 are located along arrows C and D respectively in the aforementioned embodiment, the present invention is not restricted to this but the engaging pawls 13i and 13j may alternatively be located along arrows A and B respectively. In this case, the engaging holes 7g and 7h of the lower casting 7 may be formed in correspondence to the engaging pawls 13i and 13j respectively.

While the light tunnel clip 13 is provided with the three engaging pawls 13i and the additional engaging pawl 13j in the aforementioned embodiment, the present invention is not restricted to this but the numbers of such engaging pawls 13i and 13j may be properly selected respectively.

What is claimed is:

1. A projector comprising:
   a rectangular light tunnel having a hollow light guide path capable of passing light therethrough for shaping said light with said light guide path;
   an optical component holding member provided with a holding portion holding said light tunnel; and
   a light tunnel clip including a first pressing portion and a second pressing portion pressing first and second surfaces, adjacent to each other, of said light tunnel toward said holding portion of said optical component holding member for holding said light tunnel in a pressed state, wherein
   said first pressing portion and said second pressing portion press positions of said first and second surfaces of said light tunnel located substantially on the same line perpendicular to the traveling direction of said light respectively,
   said optical component holding member includes a first engaging hole and a second engaging hole so arranged as to hold said light tunnel therebetween, and
   said light tunnel clip includes a first engaging pawl and a second engaging pawl of a springy material engaging with said first engaging hole and said second engaging hole respectively.

2. The projector according to claim 1, wherein
   said second engaging pawl of said light tunnel clip is so formed as to nip an edge of said second engaging hole of said optical component holding member.

3. The projector according to claim 1, wherein
   said light tunnel clip further includes a mask portion for screening the outer periphery of an inlet of said light tunnel from said light, and
   said optical component holding member integrally includes a positioning protrusion for positioning said light tunnel clip by coming into contact with said mask portion of said light tunnel clip.

4. The projector according to claim 3, wherein
   said optical component holding member further includes an opening for partially receiving said mask portion of said light tunnel clip.

5. The projector according to claim 1, wherein
   said holding portion of said optical component holding member includes projecting first and second support portions for supporting prescribed portions of third and fourth surfaces of said light tunnel respectively and an air inlet for cooling said light tunnel.

6. The projector according to claim 1, wherein
   said light tunnel clip is provided with two said first pressing portions, and
   said two first pressing portions are so formed as to press first and second sides of said first surface of said light tunnel along the extensional direction of said light tunnel toward said holding portion of said optical component holding member respectively.

7. The projector according to claim 6, wherein
   said light tunnel clip is provided with two said second pressing portions,
   said two second pressing portions are so formed as to press first and second sides of said second surface of said light tunnel along the extensional direction of said light tunnel toward said holding portion of said optical component holding member respectively,
   said first pressing portion and said second pressing portion pressing said first sides along the extensional direction of said light tunnel respectively press positions located on a first line perpendicular to the traveling direction of said light, and
   said first pressing portion and said second pressing portion pressing said second sides along the extensional direction of said light tunnel respectively press positions located on a second line perpendicular to the traveling direction of said light.

8. The projector according to claim 1, wherein
   said optical component holding member further includes a wall portion provided on said holding portion for regulating the position of said light tunnel on at least one side in the extensional direction of said light tunnel.

9. The projector according to claim 1, wherein
   said first pressing portion and said second pressing portion are rendered elastically deformable in the pressing directions respectively.

10. The projector according to claim 1, wherein
    said first pressing portion and said second pressing portion linearly come into contact with and press said first surface and said second surface of said light tunnel in directions intersecting with the extensional direction of said light tunnel respectively.

11. A projector comprising a rectangular light tunnel having a hollow light guide path capable of passing light therethrough for shaping said light with said light guide path and further having first, second, third and fourth surfaces, an optical component holding member holding said light tunnel and a light tunnel clip including a mask portion for screening the outer periphery of an inlet of said light tunnel from said light for fixing said light tunnel to said optical component holding member, wherein
said optical component holding member includes:
a holding portion holding said light tunnel,
a first engaging hole and a second engaging hole so arranged as to hold said light tunnel therebetween,
an opening for partially receiving said mask portion of said light tunnel clip,
a positioning protrusion integrally provided on said optical component holding member for positioning said light tunnel clip by coming into contact with said mask portion of said light tunnel clip,
projecting first and second support portions provided on said holding portion for supporting prescribed portions of said third and fourth surfaces of said light tunnel respectively, and
an air inlet provided on said holding portion for cooling said light tunnel,
said light tunnel clip includes:
a first pressing portion and a second pressing portion pressing said first and second surfaces, adjacent to each other, of said light tunnel toward said holding portion of said optical component holding member respectively, and
a first engaging pawl and a second engaging pawl of a springy material engaging with said first engaging hole and said second engaging hole respectively, and
said first pressing portion and said second pressing portion press positions of said first and second surfaces of said light tunnel located substantially on the same line perpendicular to the traveling direction of said light respectively.

12. The projector according to claim 11, wherein
said second engaging pawl of said light tunnel clip is so formed as to nip an edge of said second engaging hole of said optical component holding member.

13. The projector according to claim 11, wherein
said light tunnel clip is provided with two said first pressing portions, and
said two first pressing portions are so formed as to press first and second sides of said first surface of said light tunnel along the extensional direction of said light tunnel toward said holding portion of said optical component holding member respectively.

14. The projector according to claim 13, wherein
said light tunnel clip is provided with two said second pressing portions,
said two second pressing portions are so formed as to press first and second sides of said second surface of said light tunnel along the extensional direction of said light tunnel toward said holding portion of said optical component holding member respectively,
said first pressing portion and said second pressing portion pressing said first sides along the extensional direction of said light tunnel respectively press positions located on a first line perpendicular to the traveling direction of said light, and
said first pressing portion and said second pressing portion pressing said second sides along the extensional direction of said light tunnel respectively press positions located on a second line perpendicular to the traveling direction of said light.

15. The projector according to claim 11, wherein
said optical component holding member further includes a wall portion provided on said holding portion for regulating the position of said light tunnel on at least one side in the extensional direction of said light tunnel.

16. The projector according to claim 11, wherein
said first pressing portion and said second pressing portion are rendered elastically deformable in the pressing directions respectively.

17. The projector according to claim 11, wherein
said first pressing portion and said second pressing portion linearly come into contact with and press said first surface and said second surface of said light tunnel in directions intersecting with the extensional direction of said light tunnel respectively.

* * * * *